(12) United States Patent
Hou et al.

(10) Patent No.: US 8,301,841 B2
(45) Date of Patent: Oct. 30, 2012

(54) METHOD AND SYSTEM FOR CACHING TERMINOLOGY DATA

(75) Inventors: Xue Qiao Hou, Beijing (CN); Gang Hu, Beijing (CN); Bo Li, Beijing (CN); Jing Li, Beijing (CN); Haifeng Liu, Beijing (CN); Sheng Ping Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 12/824,357

(22) Filed: Jun. 28, 2010

(65) Prior Publication Data

US 2011/0022798 A1      Jan. 27, 2011

(30) Foreign Application Priority Data

Jun. 29, 2009   (CN) .......................... 2009 1 0150965

(51) Int. Cl.
*G06F 12/00* (2006.01)
*G06F 13/00* (2006.01)
*G06F 13/28* (2006.01)
(52) U.S. Cl. .................. 711/133; 711/118; 711/126
(58) Field of Classification Search .................. 711/118, 711/126, 133
See application file for complete search history.

(56) References Cited

U.S. PATENT DOCUMENTS

| 6,347,314 | B1 * | 2/2002 | Chidlovskii | 1/1 |
| 2002/0078300 | A1 * | 6/2002 | Dharap | 711/133 |
| 2006/0004967 | A1 * | 1/2006 | Mithal et al. | 711/152 |
| 2006/0074980 | A1 | 4/2006 | Sarkar | |
| 2007/0130112 | A1 * | 6/2007 | Lin | 707/2 |
| 2007/0294650 | A1 * | 12/2007 | Pandey et al. | 716/4 |
| 2009/0055437 | A1 | 2/2009 | Ceusters et al. | |

OTHER PUBLICATIONS

Carole Goble, "A Medical Terminology Server", Lecture Notes in Computer Science, vol. 856/1994, ISBN 978-3-540-58435-3, Springer Berlin / Heidelberg.

Marcel Karnstedt, "Semantic Caching in Ontology-based Mediator Systems", Proceedings of Berliner XML Tage, 2003, p. 155-169, Springer-Verlag.

* cited by examiner

*Primary Examiner* — Kevin Ellis
*Assistant Examiner* — Ryan Bertram
(74) *Attorney, Agent, or Firm* — Gail H Zarick

(57) ABSTRACT

A method for caching terminology data, including steps of: receiving a terminology request; determining that the terminology request is related to at least one uncached terminology concept; retrieving a complete concept set of the terminology concept as a cache unit, wherein the complete concept set includes the terminology concept, all other terminology concepts which are directly correlated or indirectly correlated through a non-transitive relationship to the terminology concept, properties of each terminology concept, and the non-transitive relationship between each terminology concept; retrieving transitive relationship information for the complete concept set, the transitive relationship information at least including identifiers of terminology concepts which are correlated through the transitive relationship to each terminology concept in the complete concept set; and caching the cache unit and the transitive relationship information of the cache unit. A corresponding device caches terminology data.

14 Claims, 6 Drawing Sheets

| Terminology Concept | Cache Unit |
|---|---|
| C1 | Cache Unit1 (C1) |
| C2 | Cache Unit1 (C1) |
| ... | ... |
| C7 | Cache Unit2 (C7) |
| C8 | Cache Unit2 (C8) |
| ... | ... |

Terminology Concept Index Information

| Term | Terminology Concept |
|---|---|
| T1 | C3, C8, Cx |
| T2 | C1, C6, C10, Cy |
| ... | ... |

Term Concept Mapping Information

| Cache Unit 1 | Reverse Transitive Relationship Information |
|---|---|
| C1 | Cx |
| C2 | Null |
| C3 | Null |
| ... | ... |
| C6 | Null |

| Cache Unit 2 | Reverse Transitive Relationship Information |
|---|---|
| C7 | Null |
| C8 | C1 |
| ... | ... |
| C12 | Null |

Reverse Transitive Relationship Information

Fig. 5

METHOD AND SYSTEM FOR CACHING TERMINOLOGY DATA

CROSS REFERENCE TO RELATED APPLICATION

This application claims priority under 35 U.S.C. 119 from Chinese Patent Application 200910150965.8, filed Jun. 29, 2009, the entire contents of which is incorporated herein by reference.

BACKGROUND OF THE INVENTION

1. Field of the Invention

The present invention relates to a data management technology, and in particular, the present invention relates to a method and system for caching semantic data in terminology services.

2. Description of Related Art

Terminology service is a service for returning specific contents from a terminology knowledge set in a specific professional domain as required by a user. Semantics-based applications, for example semantic query, need a terminology server to provide semantics support, i.e., the terminology server provides definitions of concepts and definitions of the relationships between the concepts to a client. Standard terminologies provide common understanding to the domain knowledge and facilitate efficient information processing and knowledge sharing across different parties, thus a terminology server typically holds a large amount of data. The client retrieves terminology data from the terminology server in accordance with a request regarding a terminology in an application, for supporting execution of semantic applications. In order to achieve better performance and scalability of semantic applications, it is necessary to use a local client memory device to cache the terminology data, such that the terminology data received from the terminology server is enabled for possible later use.

However, the cache space for keeping terminology data in the client memory device is limited, and it is impossible for a user to cache all terminology data in the terminology server into the client memory device. For the purpose of rapid response to a request for terminology data access and minimizing resource consumption due to network interaction with the terminology server, it is essential to determine proper cache policies, which mainly include: what data to be retrieved from the terminology server for caching in response to a terminology request, and how to cache.

A traditional cache technology, for example page and tuple buffer, can not satisfy the requirements on accessing terminology services. Page caching and tuple caching use statically defined physical units with fixed lengths, while the requested data items are specified directly using a list of physical pages or tuple identifiers. In a cache for terminology services, it is necessary to perform dynamic management on the defined data items with terminology-based semantic relationships, because components of terminology data include: a concept which is an abstract and universal idea and notion for an object, wherein term is a representation of a concept and a concept can be indicated by different terms; properties to the concept, which are attributes, characteristics, parameters and among others of the concept per se, for example properties of the concept include a term for naming the concept and other attributes of the concept; and relationships, which represent correlations among concepts. Usually, after a user requests for information of a concept in terminology data, he typically will then request for information of another concept whose dependency relationship is correlated to the concept. Thus, it is hard to reflect the semantic relationships of the terminology data in caching terminology data in accordance with the traditional caching technology, and thus it is impossible for effective response to the request for semantic application, i.e., decreasing hitting rate to the cached data in the system, and high redundancy level of the cached data per se of the client, etc.

Further, the relationships among terminology concepts include non-transitive relationships and transitive relationships, wherein a transitive relationship may be defined as: for any concepts A, B, and C and a particular relationship r, r (A, B) and r (A, C) are known, and if r (A, C) also establishes, then the relationship r is a transitive relationship, for example, "is a kind of" and "is a part of" represent a transitive relationships between correlated concepts; whereas a non-transitive relationship may be defined as: for any concepts A, B, and C and a particular relationship r, r (A, B) and r (B, C) are known, and if r (A, C) does not establish, then the relationship r represents a non-transitive relationship, for example "interacts" represents a non-transitive relationship of correlated concepts.

It should be understood that, the specific expression for a transitive relationship is: concept A $\xrightarrow{r}$ concept B, concept B $\xrightarrow{r}$ concept C, then there is concept A $\xrightarrow{r}$ concept C. The current caching mechanism can not embody the transitive relationship present among concepts which are not directly correlated, i.e., the relationship between concept A and concept C. Thus, it is impossible for effective response to the request involving transitive relationship, for example, the client needs to retrieve information of all concepts correlated to a given concept through a transitive relationship.

Thus, as required by terminology services, a new solution is needed to cache at the client terminology data from the terminology server.

SUMMARY OF THE INVENTION

In accordance with one aspect of the present invention, a computer implemented method for caching terminology data includes the steps of: receiving a terminology request; determining that the terminology request is related to at least one uncached terminology concept; retrieving a complete concept set of the terminology concept as a cache unit, wherein the complete concept set comprises (i) the terminology concept, (ii) all other terminology concepts which are directly correlated or indirectly correlated through a non-transitive relationship to the terminology concept, (iii) properties of each terminology concept, and (iv) the non-transitive relationship between each terminology concept; retrieving transitive relationship information for the complete concept set, the transitive relationship information comprising identifiers of terminology concepts which are correlated through the transitive relationship to each terminology concept in the complete concept set; and caching the cache unit and the transitive relationship information of the cache unit. Each of the foregoing steps is performed by a programmed computer.

In accordance with another aspect of the present invention, a device for caching terminology data includes: means for receiving a terminology request; means for determining that the terminology request is related to at least one uncached terminology concept; means for retrieving a complete concept set of the terminology concept as a cache unit, wherein the complete concept set comprises the terminology concept, all other terminology concepts which are directly correlated or indirectly correlated through a non-transitive relationship to the terminology concept, properties of each terminology concept, and the non-transitive relationship between each terminology concept; means for retrieving transitive relationship information for the complete concept set, the transitive relationship information at least comprising identifiers of terminology concepts which are correlated through the transitive relationships to each terminology concept in the complete concept set; and means for caching the cache unit and the transitive relationship information of the cache unit.

The technical solution of the present invention enables the cached terminology data to reflect semantic relationships among terminology data to a great extent, thereby effectively responding to the terminology request of semantic applications and prominently improving hit rate to the cache data in the terminology service system. Moreover, the technical solutions according to the present invention can reduce network interaction with the terminology server incurred by retrieving semantic relationships among terminology data, and lower the redundancy degree of the terminology data cached in the client.

BRIEF DESCRIPTION OF THE DRAWINGS

Through the following description with reference to the accompanying drawings and with a more thorough understanding to the present invention, other objectives and effects of the present invention will become much clearer and more comprehensible. In the drawings:

FIG. 5 schematically shows additional data form for caching terminology data according to an embodiment of the present invention;

In all of the figures, like reference numbers represent same, similar or corresponding features or functions.

DESCRIPTION OF THE PREFERRED EMBODIMENTS

Figure 1:
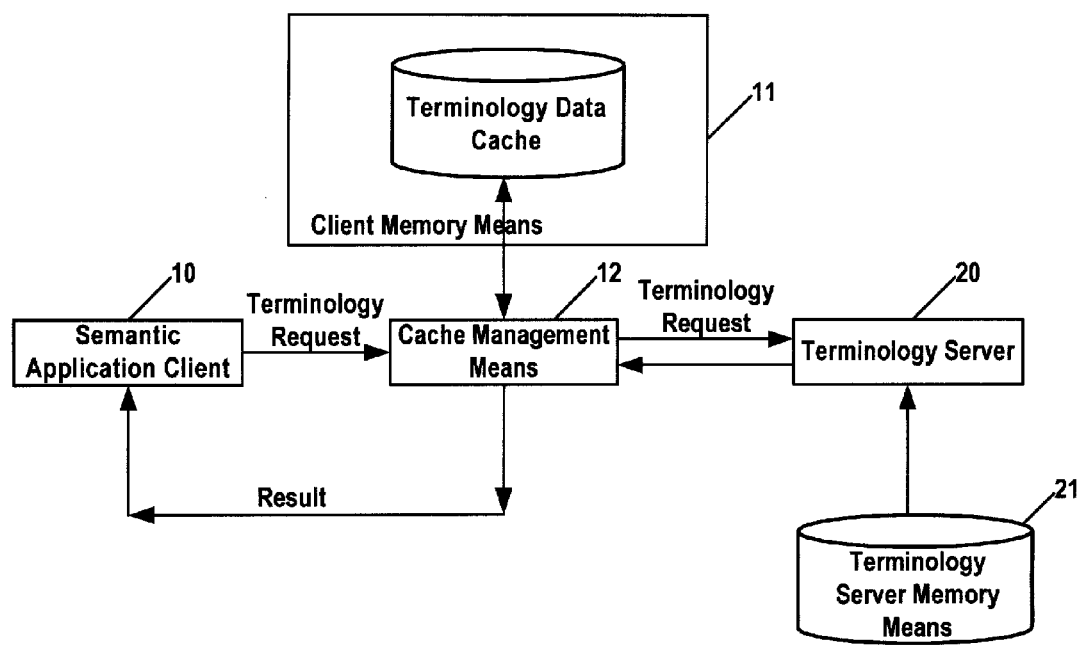
FIG. 1 schematically shows a system for caching terminology data according to an embodiment of the present invention.

FIG. 1 schematically shows a system for caching terminology data according to an embodiment of the present invention.

As shown in FIG. 1, the system for caching terminology data according to an embodiment of the present invention includes at a client side a semantic application client 10, client memory means 11 for caching terminology data, cache management means 12 for managing caching of terminology data, and at the server side a terminology server 20, a terminology server memory means 21.

The semantic application client 10 sends a terminology request. Responsive to the terminology request, the cache management means 12 queries the terminology data addressed by the terminology request among terminology data cached in the client memory means 11. If the corresponding terminology data items have been cached in the client memory means 11, then the cache management means 12 directly returns the query result to the semantic application client 10. If the terminology data addressed by the terminology request have not been cached in the client memory means 11, then the cache management means 12 queries the terminology server 20 for retrieving relevant terminology data, and stores the retrieved data in a certain data form in the client memory means 11, and returns the retrieved query result to the semantic application client 10.

As previously mentioned, components of terminology data include: a concept; properties for the concept; including a term for naming the concept and other attributes of the concept; and relationships denoting correlations among concepts. Moreover, the relationships among terminology data concepts may be either non-transitive or transitive. Thus, the cache management means 12 is required to enable the obtained terminology data per se for caching and the data form for caching the terminology data to reflect the semantic relationships among the terminology data, thereby supporting rapid response to the request to access the terminology data and minimizing resource consumption incurred by network interaction with the terminology server.

The inventor of the present invention has realized the following facts: in terminology services, successive requests are always performed to terminology concepts which are correlated one another; a terminology concept is directly correlated through a non-transitive relationship with only a few concepts, and the depth for an indirect non-transitive relationship is limited, which is typically less than 5.

Based on the above facts, the present invention provides a method for caching terminology data. For example, the method can be implemented by the cache management means 12 as shown in FIG. 1, so as to satisfy the requirements for accessing terminology data.

Figure 2:
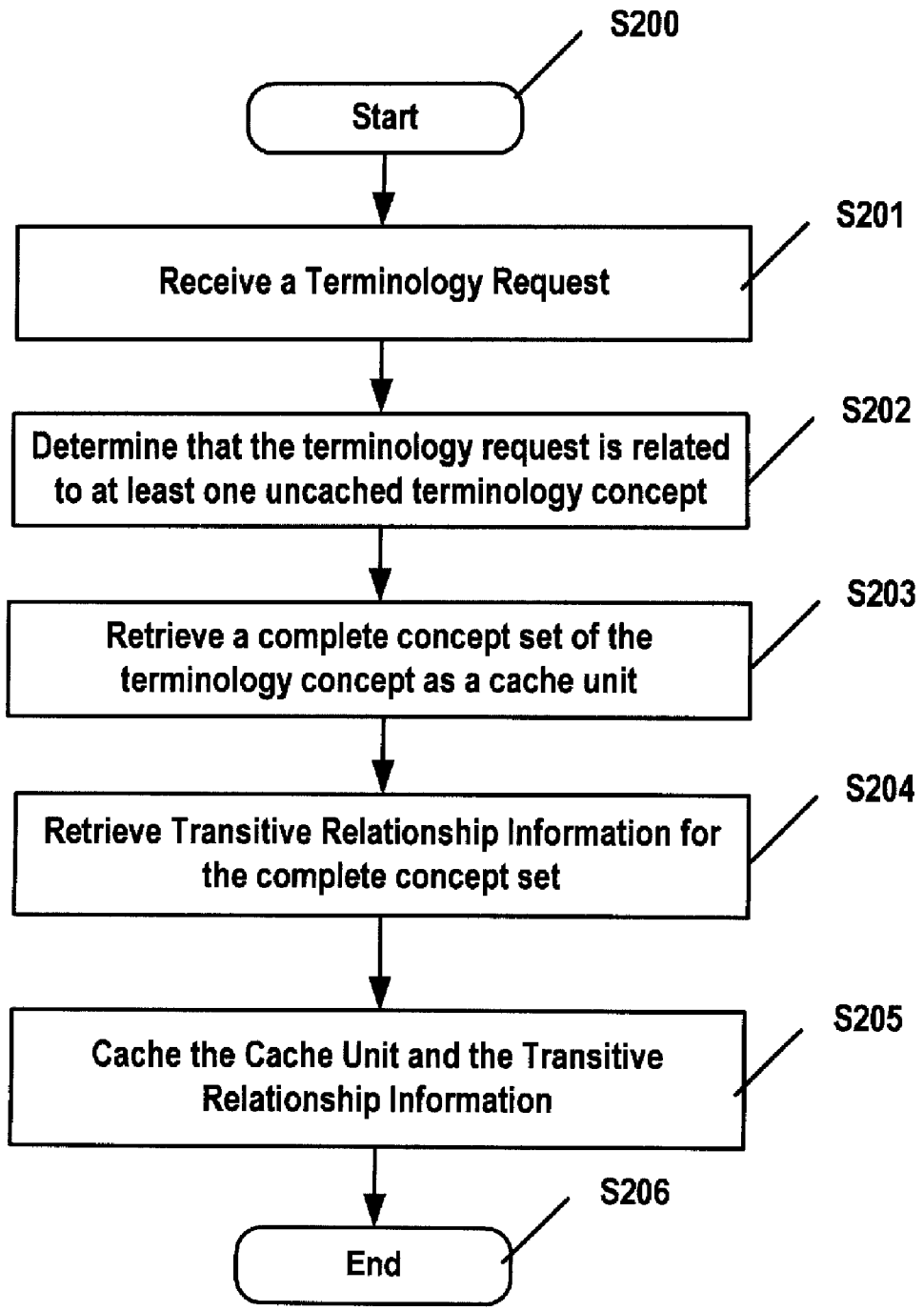
FIG. 2 schematically shows a flow chart of a method for caching terminology data according to an embodiment of the present invention.

FIG. 2 schematically shows a flow chart of a method for caching terminology data according to an embodiment of the present invention;

As shown in FIG. 2, at step S200, the method flow starts.

At step S201, a terminology request is received. For example, the cache management means 12 receives a terminology request from the semantic application client 10. The terminology request for example may include: a request for a certain terminology concept, a request for a term, a request for a terminology concept related to a certain relationship, a request about two terms, etc. The kind and specific content of a terminology request are dependent on the requirements of the semantic application supported by the semantic application client 10. However, any request can be finally reduced into a query to the minimum component of terminology data, i.e., to terminology concepts and relationships among terminology concepts. Thus, the present invention is applicable to any kind of terminology requests which are mentioned or not mentioned in the present text.

At step S202, it is determined that the terminology request is associated with at least one uncached terminology concept. The cache management means 12 queries the terminology data addressed by the terminology request among terminology data cached in the client memory means 11. If hit, the flow returns the query result; if not hit, then it is determined that the received terminology request is associated with at least one uncached terminology concept. The determining step may be typically implemented only through the interaction between the cache management means 12 and the client memory means 11. Under certain special conditions, the determining step may also include the interaction between the cache management means 12 and the terminology server 20. For example, when the input of terminology request is relationship, which then requires retrieving the associated terminology concepts, the cache management means 12 is required to interact with the terminology server 20 for retrieving the information of the associated terminology concepts, and if there are at least one terminology concept not cached in the client memory means 11, then it is determined that the received terminology request is associated with the at least one uncached terminology concept.

At step S203, a complete concept set of the terminology concept is retrieved and taken as a cache unit. The complete concept set of a uncached terminology concept includes the terminology concept per se, all other terminology concepts directly correlated or indirectly correlated to the terminology concepts through a non-transitive relationship, properties of each terminology concept, and non-transitive relationships among each terminology concept. In a preferred embodiment, the cache management means 12 sends a terminology request to the terminology server 20 in accordance with the content requirements of the complete concept set. Responsive to the terminology request sent by the cache management means 12, the terminology server 20 provides corresponding terminology data to the cache management means 12. The cache management means 12 takes the received terminology data about the complete concept set as a cache unit. The cache unit may have a certain data form, for example, tree structure, to represent the included terminology data.

At step S204, transitive relationship information is retrieved with respective to the complete concept set. The transitive relationship information at least includes identifiers of terminology concepts correlated through a transitive relationship with each terminology concept contained in the complete concept set. In fact, the transitive relations may include a plurality of specific transitive relationships, for example "is", "belongs to", and "is propagated to", etc. If there is a plurality of transitive relationships at the same time in terminology data, it is necessary to retrieve, for each terminology concept and each specific transitive relationship, the terminology concepts correlated through the specific transitive relationship. In a preferred embodiment, the cache management means 12 sends a terminology request to the terminology server 20, to retrieve, for each terminology concept in the complete concept set, the terminology concepts directly correlated thereto through the transitive relationships. The transitive relationship information may have a certain data form, for example, a data table, to indicate the correspondence relationship between each terminology concept contained in the complete concept set and terminology concepts which are directly correlated thereto through the transitive relationships. Here, it should be noted that, in the transitive relationship information, it is not necessary to retrieve various properties of the terminology concepts correlated through the transitive relationships, and it is only required to record the identifiers of the terminology concepts. Thus, the transitive relationship information of the complete concept set will not take up a big cache space.

At step S205, the cache unit and the transitive relationship information of the cache unit are cached. The cache management means 12 takes the retrieved complete concept set as a cache unit to be cached into the client memory means 11. Thus, the cache unit, as a basic unit for cache update, is dynamically variable. The cache management means 12 caches the transitive relationship information of the complete concept set for each cache unit, and when the cache unit is updated, the transitive relationship information is updated accordingly.

At step S206, the method flow ends.

The skilled in the art may appreciate that, since terminology data about the terminology concepts and the non-transitive relationships between them is cached in the client memory means 11 on a basis of the complete concept set as a cache unit and the transitive relationship information of the complete concept set for each cache unit is maintained in the client memory means 11, these cached terminology data can reflect semantic relationships of terminology data to a great extent, thereby greatly reducing the network interaction with the terminology server in order to retrieve the semantic relationships of the terminology data. Moreover, the cache space for the caching unit and the non-transitive relationship information is limited so that it is possible to provide a greater amount of more effective information in the limited cache space.

A specific data form for caching terminology data according to an embodiment of the present invention is described in detail below with reference to FIGS. 3-5.

Figure 3:
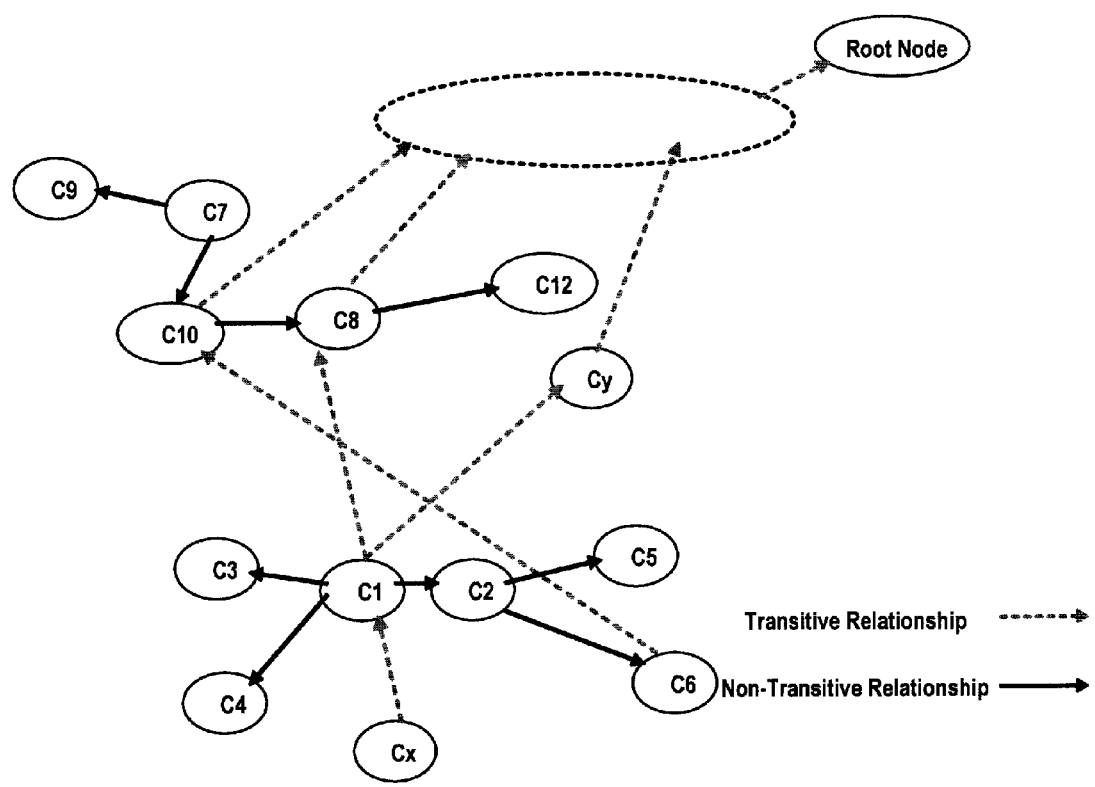
FIG. 3 shows an example of a structure of terminology data.

FIG. 3 shows an example of a structure of terminology data. The structure of the terminology data may be a terminology segment maintained in the terminology server memory means 21. As shown in FIG. 3, the structure of the terminology data includes a root node and a plurality of terminology concepts as its descendent nodes. Terminology concepts are correlated through a transitive relationship or a non-transitive relationship, wherein the transitive relationship in FIG. 3 is indicated by a dotted-line arrow, while the non-transitive relationship is indicated by a solid-line arrow. For example, the terminology concept C7 is directly correlated to the terminology concepts C9 and C10 through a non-transitive relationship and is further indirectly correlated with the terminology concepts C8 and C12. Besides, the terminology concept C7 is further correlated with other terminology concepts (not shown) through the transitive relationship.

Figure 4:
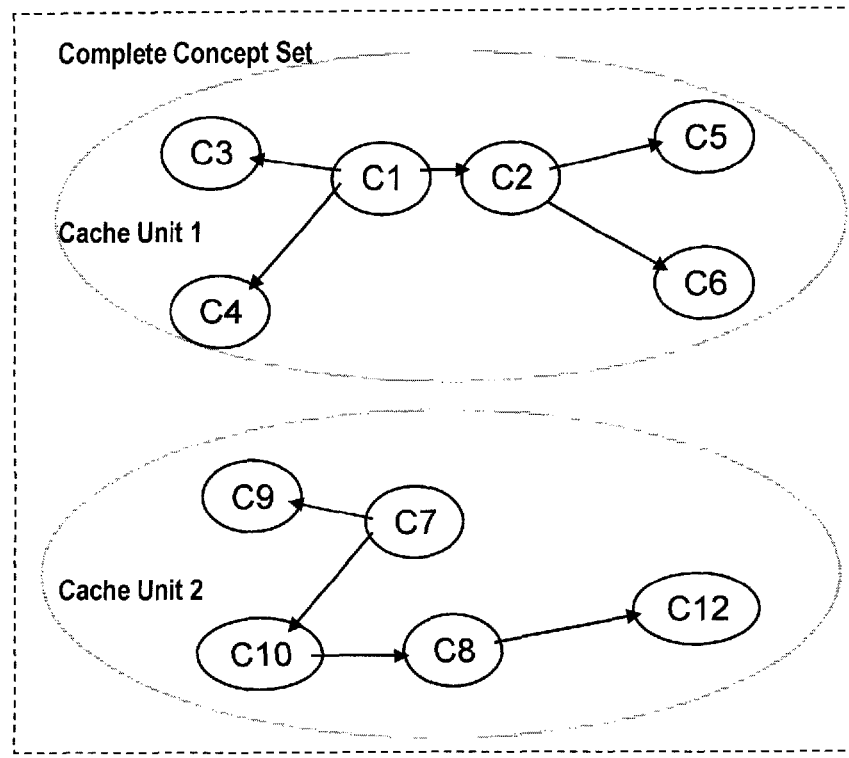
FIG. 4 schematically shows data form for caching terminology data according to an embodiment of the present invention.

FIG. 4 schematically shows data form for caching terminology data according to an embodiment of the present invention.

As shown in FIG. 4, the cached data form includes a complete concept set as a cache unit and transitive relationship information for each cached unit. In the example, the complete concept set as a cache unit is represented with a tree structure, while the transitive relationship information is represented with a form of a table. The skilled in the art may understand that, any possible data form can also be used to represent the complete concept set and transitive relationship information, and the specific data form in use shall not constitute a limitation to the present invention.

The cache terminology data as shown in FIG. 4 is a possible data cache to a terminology segment maintained in the terminology server memory means 21 as shown in FIG. 3. Caching the terminology data is performed in response to a terminology request. Thus, for the same terminology structures at the terminology server end, different cache contents may be generated at the client end. FIG. 4 only shows a possible cache content.

The cache unit 1 and the transitive relationship information table for the cache unit 1 are retrieved and cached in response to a terminology request. The terminology request is associated with the terminology concept C1, while the terminology concept C1 is not cached in the client memory means 11 upon the terminology request. From the terminology segment maintained in the terminology server memory means 21 as shown in FIG. 3, it is seen that the terminology concepts which are directly correlated to the terminology concept C1 through a non-transitive relationship include C3, C4, C2, and the terminology concepts which are indirectly correlated thereto through the non-transitive relationship include C5, C6 (which are directly correlated to C2). In this way, the terminology concepts C1-C6 form a complete concept set of the terminology concept C1. The cache management means 12 receives the terminology concepts C1-C6 and respective properties of the C1-C6, as well as the non-transitive relationship among C1-C6, from the terminology server 20, as a cache unit 1 for caching, wherein the terminology concept C1 is a root node of the cache unit 1, which has an in-degree of 0.

In another aspect, from the terminology segment maintained in the terminology server memory means 21 as shown in FIG. 3, it is seen that some terminology concepts among the terminology concepts C1-C6 also have the transitive relationship. The terminology concept C1 is correlated to the terminology concepts C8 and Cy through the transitive relationship; the terminology concept C6 is correlated to C10 through the transitive relationship. The cache management means 12 retrieves, for the complete concept set as the cache unit 1, the above transitive relationship information from a terminology server 20, and caches the same as transitive information table for the cache unit 1. In the example as shown in FIG. 4, the transitive relationship information only includes identifiers of terminology concepts directly correlated through the transitive relationship, i.e., the identifiers of immediately adjacent children terminology concepts. In other embodiments, the identifiers of the next level or next n-level (n is finite) indirectly correlated terminology concepts may be further displayed. At this time, it is necessary to maintain the transitive information table within a finite and reasonable data size, thereby solving the issue of cache space while improving the speed of accessing cache terminology data.

Similarly, the cache unit 2 and the transitive relationship information table for the cache unit 2 are retrieved and cached in responding to the terminology request. The terminology request is associated with the terminology concept C7, while the terminology concept C7 is not cached in the client memory means 11 upon performing the terminology request. The cache unit 2 includes a complete concept set C7-C10 and C12 of the terminology concept C7, respective properties of the terminology concepts C7-C10 and C12, and the non-transitive relationship among C7-C10 and C12. The transitive relationship information table for the complete concept set as the cache unit 2 indicates the non-transitive relationship present among C7-C10 and C12.

It should be noted that the terminology concepts (displayed in the right column of the sheet) correlated through a transitive relationship as indicated in the transitive relationship information may be the terminology concepts which have not been cached to the client memory means 11 yet. For example, in the transitive relationship information table as shown in FIG. 4, the terminology concept C1 included in the cache unit 1 is correlated to C8 and Cy through the transitive relationship, wherein Cy does not belong to any cache unit which has not been currently cached and has not been loaded to the cache yet. When any terminology request involves the terminology concept Cy, the cache management means 12 may request for Cy to take its complete concept set as a new cache unit to be loaded to the cache.

It should be noted that, though for the sake of simplicity, FIG. 4 only uses a generic expression "transitive relationship". However, in fact, the transitive relationship may include a plurality of specific transitive relationships, for example "is", "belongs to", "is propagated to", etc. If the terminology data has a plurality of transitive relationships at the same time, it is necessary to indicate, for each terminology concept and for each specific transitive relationship related to the concept in the transitive relationship information, the terminology concepts correlated through the transitive relationship.

FIG. 5 schematically shows an additional data form or caching terminology data according to an embodiment of the present invention. By using the additional data form, it is possible to access the cached terminology data more quickly and conveniently on the basis of the basic data form as shown in FIG. 4.

In an example, the additional data form may include terminology concept index information. The terminology concept index information may be generated for all cache units in the form of table, for indicating mapping relationship between the currently cached terminology concepts and the cache unit to which they belong. Responsive to the terminology request, the cache management means 12 can determine to which cache unit a terminology concept belongs through searching the table, thereby improving the hitting rate.

In another example, the additional data form may further include term concept mapping information. The term concept mapping information may be implemented in a table form, for indicating mapping information between terms and terminology concepts. As previously mentioned, a term is a property of a terminology concept, for naming the terminology concept. The same term can be act as the properties of a plurality of terminology concepts. The terminology request may be directly associated with a term. When a terminology request is about a specific term, though the term per se as one of the properties of terminology concept has been loaded to the cache through the cache unit, it may be time-consuming to search the properties of terminology concepts one by one. Thus, in order to improve the efficiency of processing a terminology request for a term, in a preferred embodiment, the term concept mapping information can be cached for further use.

In still another embodiment, the additional data form may further include reverse transitive relationship information. The reverse transitive relationship information may be implemented as a form of table, for indicating a transitive relationship reverse to that indicated by the transitive relationship information. For example, if the transitive relationship information includes identifiers (ID) of immediately adjacent children terminology concepts correlated to the terminology concept through the transitive relationship, corresponding reverse transitive relationship information may include identifiers (ID) of the immediately adjacent parent terminology concept. Thus, bi-directional access to the terminology concept regarding the transitive relationship can be enabled in the cache. When the terminology data includes a plurality of specific transitive relationships, the reverse transitive relationship information should indicate, for each data concept and each specific transitive relationship, the data concepts correlated through the transitive relationship, corresponding to the transitive relationship information.

The skilled in the art should understand, the additional data form applicable to the present invention for caching terminology data is not limited to the data forms as described above. Various kinds of additional data forms for improving cache access performances can be constructed as practically required, for example, compiling indexes for the terminology concepts with other criterions. Apparently, due to increase of the information for describing cache terminology data, the efficiency for accessing the cache is improved. However, such improvement pays a cost that the additional data consumes cache space. Such problem is prevalent in various kinds of cache technologies, which will not be discussed further here.

Figure 6:
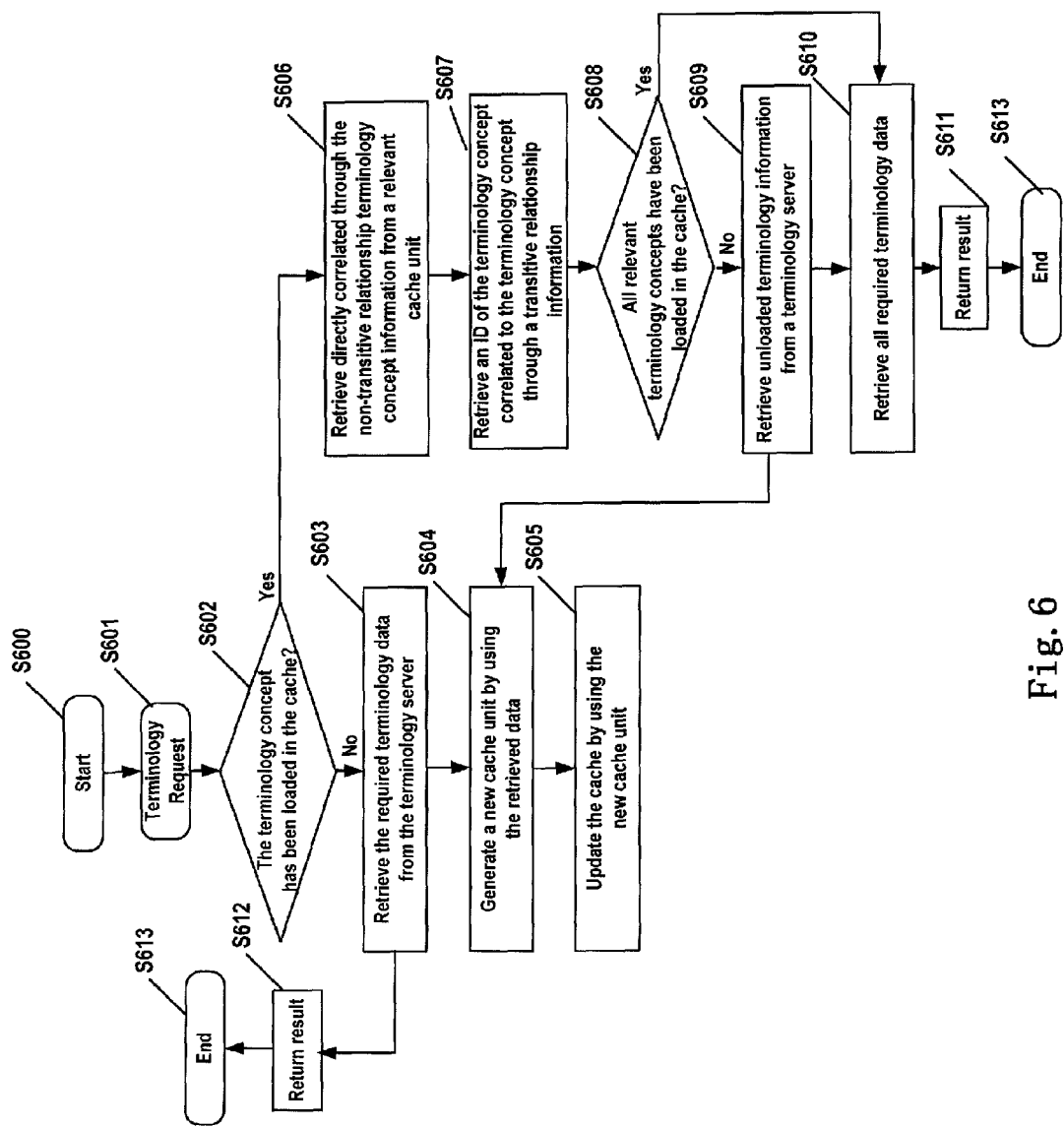
FIG. 6 schematically shows a flow chart of processing a terminology request from a semantic application client according to an embodiment of the present invention.

FIG. 6 schematically shows a flow chart of processing a terminology request from a semantic application client according to an embodiment of the present invention. In this example, a processing flow for a terminology request for a terminology concept is described.

As shown in FIG. 6, the flow starts.

At step S601, a terminology request for a terminology concept is received.

At step S602, it is determined whether the terminology concept has been loaded in a cache.

If the result of determination at step S602 is "no", then the processing proceeds to step S603; if the result of determination at S602 is "yes", then processing proceeds to step S606.

At step S603, since the terminology concept is not loaded in the cache, the required terminology data is retrieved from the terminology server. According to an embodiment of the present invention, for example, retrieving the complete concept set of the terminology concept and the transitive relationship information of the complete concept set as described with reference to FIG. 4 in the manner as described at steps S203 and S204 with reference to FIG. 2. According to a further embodiment of the present invention, the information required by the additional data form as described with reference to FIG. 5 may be further retrieved, for example, a reverse transitive relationship information, etc.

Since all required data have been retrieved, at step S612, the query result is returned. At this time, at step S613, the processing ends.

At step S604, a new cache unit is generated based on the retrieved data.

At step S605, the cache in the client memory means is updated by using a new cache unit, and the transitive relationship information is updated correspondingly. Besides, if there is additional data form information in the cache, for example terminology concept index information, term concept mapping information, and reverse transitive relationship information, etc, it is necessary to update such information at the same time.

The policy for cache update may be determined depending on the use frequency of the cache unit and the use time period of the cache unit (whether the cache unit is used recently). For example, when updating a cache unit depending on the use frequency of the cache unit, the visit times may be saved for each cache unit, and upon updating, the cache unit with the minimum visit times is replaced with a new cache unit. When updating a cache unit depending on the use time period of the cache unit, the recent visit time period may be saved for each cache unit, and upon updating, the cache unit with the earliest visit time is replaced with a new cache unit. Of course, any proper policy can also be used to update the cache unit.

There is such a condition in updating the cache unit: a sub-node (with an in-degree larger than zero) of the retrieved new complete concept set a as the new cache unit is the root node (with an in-degree of zero) of the complete concept set b which serves as the currently loaded cache unit. Then, under this condition, the complete concept set a may be completely merged to the complete concept b, as a new cache unit. By merging the complete concept sets, unnecessary redundancy as present in the cached terminology data is effectively eliminated, thereby improving the utility rate of the cache space.

At step S606, since the requested terminology concepts has been loaded in the cache, for example, under a query condition, the terminology concept information directly correlated through the non-transitive relationship is retrieved from a relevant cache unit.

At step S607, the IDs of the terminology concepts correlated to the terminology concept through a transitive relationship information is retrieved from the transitive relationship information.

At step S608, it is determined whether all terminology concepts correlated through the transitive relationship information have been loaded in the cache.

If the result of determination at step S608 is "yes", then the processing proceeds to step S610; if the result of determination at step S608 is "no", then processing proceeds to step S609.

At step S609, since not all the required terminology concepts are loaded in the cache, it is necessary to retrieve the unloaded terminology information from a terminology server. Thus, According to an embodiment of the present invention, for example, retrieving the complete concept set of the terminology concepts and the transitive relationship information of the complete concept set as described with reference to FIG. 4 in the manner as described at steps S203 and S204 with reference to FIG. 2. According to a further embodiment of the present invention, the information required by the additional data forms as described with reference to FIG. 5 may be further retrieved, for example, a reverse transitive relationship information, etc. Next, on one hand, the flow proceeds to step S604 to generate a new cache unit for the retrieved terminology data, and further the cache unit is updated at step S605.

At step S610, all the required terminology data are retrieved. If the result of determination at step S608 is "yes", then all the required terminology data may be retrieved from the cache; if the result of determination at step S609 is "no", then on one hand, the required terminology data are retrieved from the cache, and on the other hand, the remaining required terminology data are required through S609.

At step S611, the query result is returned. At this time, at step S613, the processing ends.

The purpose for providing the description of the present invention is for illustration and description, not for exhausting or limiting the present invention within the forms as disclosed. To a person of ordinary skill in the art, many modifications and alterations are obvious. The skilled in the art should also appreciate that, the method and device in the embodiments of the present invention may be implemented in a manner of software, hardware, firmware or the combination thereof.

Thus, selection and description of the embodiments is to better explain the principle of the present invention and its practical application and to enable a person of normal skill in the art to understand that, without departing from the spirit of the present invention, all modifications and alterations fall within the protection scope of the present invention as defined in the claims.

What is claimed is:

1. A computer implemented method for caching terminology data, comprising:
   receiving a terminology request;
   determining that the terminology request is related to at least one uncached terminology concept;
   retrieving a complete concept set of the terminology concept as a cache unit, wherein the complete concept set comprises (i) the terminology concept, (ii) all other terminology concepts which are directly correlated or indirectly correlated through a non-transitive relationship to the terminology concept, (iii) properties of each terminology concept, and (iv) the non-transitive relationship between each terminology concept;
   retrieving transitive relationship information for the complete concept set, the transitive relationship information comprising identifiers of terminology concepts which are correlated through the transitive relationship to each terminology concept in the complete concept set; and caching the cache unit and the transitive relationship information of the cache unit;
wherein each of the foregoing steps is performed by a programmed computer.

2. A method according to claim 1, wherein the transitive relationship information comprises identifiers of terminology concepts directly correlated through a transitive relationship to each terminology concept in the complete concept set.

3. A method according to claim 1, further comprising generating terminology concept index information for indicating a correspondence relationship between each terminology concept in the currently cached complete concept set and the cache unit to which it belongs.

4. A method according to claim 1, wherein properties of the terminology concept comprise a term,
the method further comprising retrieving term concept mapping information, for indicating a mapping relationship between the terms and the terminology concepts.

5. A method according to claim 1, further comprising retrieving reverse transitive relationship information, for indicating a transitive relationship reverse to the transitive relationship indicated by the transitive relationship information, wherein if the transitive relationship information comprises an identifier of an immediately adjacent child terminology concept correlated through the transitive relationship to the terminology concept, then the reverse transitive relationship information comprises an identifier of an immediately adjacent parent terminology concept correlated through the transitive relationship to the terminology concept, and vice versa.

6. A method according to claim 1, further comprising updating currently cached data by using a retrieved cache unit and updating the transitive relationship information accordingly.

7. A method according to claim 6, further comprising merging the retrieved complete concept set as a cache unit with a complete concept set of the cache unit as a current cached cache unit into a new cache unit.

8. A device for caching terminology data, comprising:
means for receiving a terminology request;
means for determining that the terminology request is related to at least one uncached terminology concept;
means for retrieving a complete concept set of the terminology concept as a cache unit, wherein the complete concept set comprises the terminology concept, all other terminology concepts which are directly correlated or indirectly correlated through a non-transitive relationship to the terminology concept, properties of each terminology concept, and the non-transitive relationship between each terminology concept;
means for retrieving transitive relationship information for the complete concept set, the transitive relationship information at least comprising identifiers of terminology concepts which are correlated through the transitive relationships to each terminology concept in the complete concept set; and
means for caching the cache unit and the transitive relationship information of the cache unit.

9. A device according to claim 8, wherein the transitive relationship information comprises identifiers of terminology concepts directly correlated through a transitive relationship to each terminology concept in the complete concept set.

10. A device according to claim 8, further comprising means for generating terminology concept index information for indicating a correspondence relationship between each terminology concept in the currently cached complete concept set and the cache unit to which it belongs.

11. A device according to claim 8, further comprising means for retrieving term concept mapping information, the term concept mapping information indicating a mapping relationship between the terms and the terminology concepts, wherein properties of the terminology concept comprise the term.

12. A device according to claim 8, further comprising means for retrieving reverse transitive relationship information, the reverse transitive information indicating a transitive relationship reverse to the transitive relationship indicated by the transitive relationship information, wherein if the transitive relationship information comprises an identifier of an immediately adjacent child terminology concept correlated through the transitive relationship to the terminology concept, then the reverse transitive relationship information comprises an identifier of an immediately adjacent parent terminology concept correlated through the transitive relationship to the terminology concept, and vice versa.

13. A device according to claim 8, further comprising means for updating currently cached data by using a retrieved cache unit and updating the transitive relationship information accordingly.

14. A device according to claim 13, further comprising means for merging the retrieved complete concept set as a cache unit with a complete concept set of the cache unit as a current cached cache unit into a new cache unit.

* * * * *